United States Patent Office 2,846,943
Patented Aug. 12, 1958

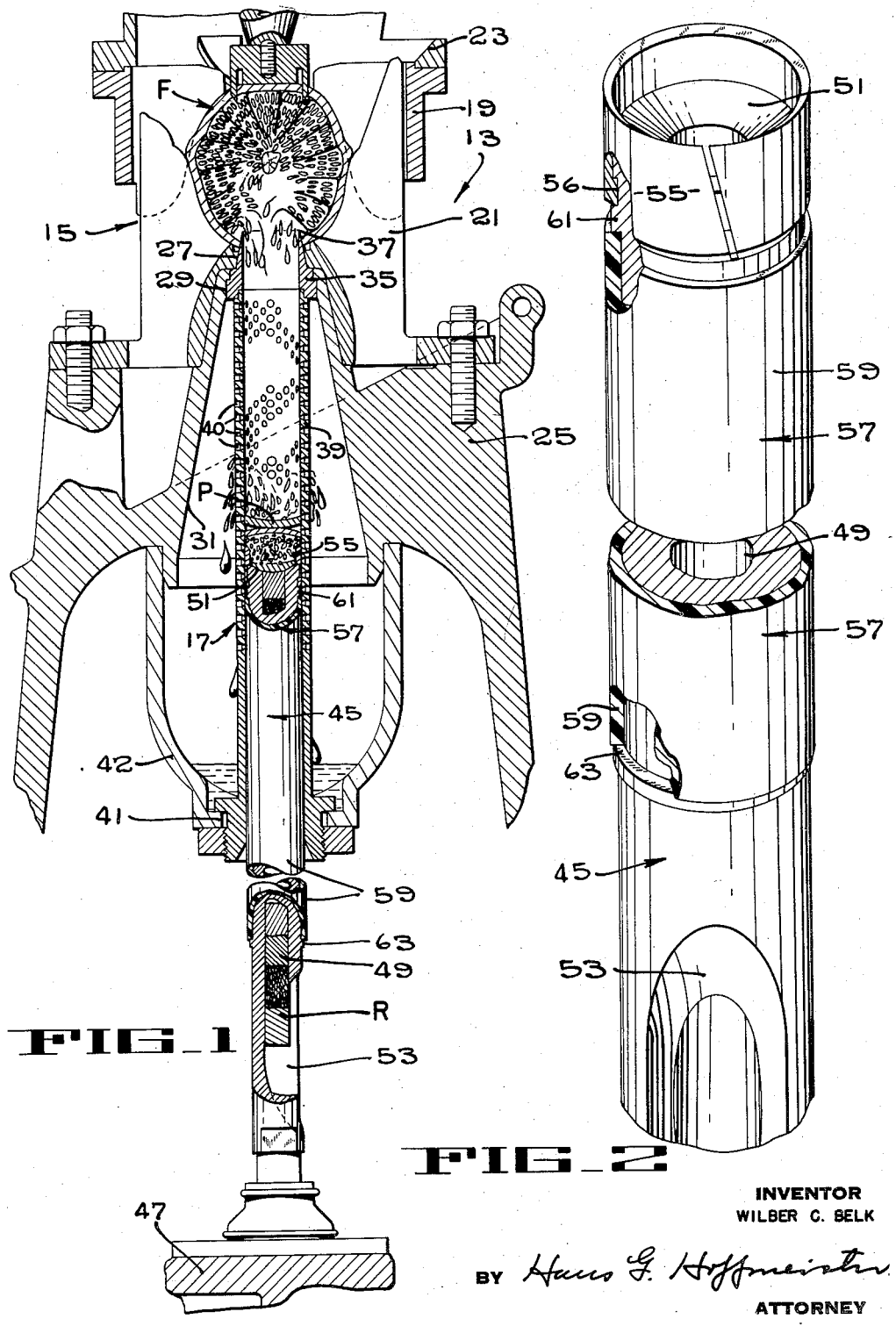

2,846,943

APPARATUS FOR SEPARATING LIQUID AND SOLID MATERIAL

Wilber C. Belk, Lakeland, Fla., assignor to Food Machinery and Chemical Corporation, San Jose, Calif., a corporation of Delaware Application August 23, 1954, Serial No. 451,417

2 Claims. (Cl. 100—108)

The present invention relates to apparatus for separating liquid and solid material of the type which employs a tubular strainer within which a movable pressure exerting member, such as a plunger, is disposed.

In separators of the type referred to above, the strainer and the pressure exerting member are usually made of high strength materials, such as metals, having similar physical characteristics. For instance, where it is desired to separate corrosive liquids and solids, such as citrus fruit juice and pulp, both the strainer and pressure exerting member are almost always made of stainless steel. It has been found that with the small clearances necessary in these separators to obtain top efficiency, and under the high operating pressures developed in these separators, the bearing loads on their strainers and their pressure exerting members are such that the opposed, bearing surfaces of these parts tend to quickly gall and become rough. This tendency to gall is greatly increased when stainless steels are used due to their high frictional qualities. Once galling of the strainer or the pressure exerting member, or both, begins, it is only a short time before the pressure exerting member will begin to stick in the strainer. Shortly thereafter, the pressure exerting member will seize in the strainer, the two parts becoming mechanically bonded, thus necessitating their replacement.

One object of the present invention is to provide a new and improved separator of the above mentioned type.

Another object is to provide a separator of the above mentioned type in which sticking and seizing of the pressure exerting member in the tubular strainer due to galling of said parts is eliminated.

Another object is to provide a separator of the type referred to above wherein the clearance between the pressure exerting member and the tubular strainer is exceptionally small.

Another object is to provide a novel and improved strainer construction for separating the pulp and portions of the peel from the juice extracted from citrus fruit by a power-driven citrus fruit juice extracting machine.

Another object is to provide a plunger for a citrus fruit pulp and juice separator, which plunger is constructed in accordance with a new and improved design.

These and other objects and advantages of the present invention will become apparent from the following description and the accompanying drawings in which:

Fig. 1 is a fragmentary vertical section of a citrus fruit juice extracting mechanism having the separator of the present invention incorporated therein.

Fig. 2 is an enlarged perspective view of a portion of the mechanism shown in Fig. 1, certain parts thereof being broken away.

The separator of the present invention is illustrated in connection with a citrus fruit juice extracting apparatus 13 (Fig. 1) of the type described and claimed in U. S. Patent No. 2,649,730 to James M. Hait, issued August 25, 1953; the co-pending application of Elmer F. Frost, Jr., and myself, Serial No. 338,234, now Patent No. 2,780,988 granted Feb. 12, 1957, filed February 24, 1953; and my co-pending application, Serial No. 338,781, filed October 28, 1953. Only those portions of the entire juice extractor 13 necessary for a complete understanding of the present invention have been shown, and for complete details of the construction and operation of the juice extractor 13 reference should be had to the above mentioned patent.

The citrus fruit juice extractor 13 (Fig. 1) comprises a whole fruit squeezing mechanism 15 and a cooperating juice separating apparatus 17, embodying the present invention, positioned therebelow. The fruit squeezing mechanism 15 comprises a pair of digitated, upper and lower cups 19 and 21, respectively. The upper digitated cup 19 is secured in a downwardly facing position to a vertically reciprocable head 23 for movement into and out of interdigitation with the lower digitated cup 21 which is rigidly supported on a stationary bedplate 25 in an upwardly facing position and in vertical alignment with the upper cup 19. The lower cup 21 and the bedplate 25 are provided with vertically aligned apertures 27 and 29, respectively, which communicate with a frusto-conical chamber 31 formed in the bedplate 25. A tubular knife 35 fits tightly within the apertures 27 and 29 and has an annular blade 37 that extends upwardly beyond the aperture 27 into the cavity of the lower cup 21. The knife 35 is supported in the apertures 27 and 29 by the upper end of a cylindrical straining tube 39 which is axially aligned with the apertures 27 and 29 and the knife 35. The tube or strainer 39 forms a part of the juice separating apparatus 17 and has a multiplicity of small perforations 40 provided in the upper portion of its wall. The straining tube 39 is removably fastened in an aperture 41 provided in the bottom of a juice collecting sump 42 sealed around the lower open end of the chamber 31.

The straining tube 39 slidably receives a pressure exerting member in the form of an elongated cylindrical plunger 45 that is fastened in an upwardly extending position to a crosshead 47, only a fragment of which is shown. The crosshead 47 is operatively connected with the upper cup supporting head 23 for vertical reciprocation in timed relation therewith, in a manner not herein shown but fully disclosed in the above mentioned patent. The plunger 45 (Fig. 2) is provided with an axial passage 49 which communicates with the interior of the straining tube 39 through an upwardly flaring mouth 51 in the upper end of the plunger. The lower end of the axial passage 49 connects with a longitudinal slot 53 milled in the side of the plunger 45 adjacent its point of attachment to the crosshead 47. A longitudinally slit, annular, resilient knife 55 (Fig. 2) is telescoped over the upper end of the plunger 45 and is secured thereto by a tongue and groove joint 56 which permits the knife to be expanded diametrally but which will not permit it to be displaced axially. The knife 55 is adapted to be expanded against and to scrape the inner surface of the tube 39 during the juice separating upward stroke of the plunger 45, thereby removing foreign matter, e. g., fruit pulp and fibers, from the inner surface of the tube 39.

In operation with the upper cup 19 (Fig. 1) in its raised position (not shown) and the plunger 45 in its lowered position (also not shown), fruit F, such as an orange, is fed into the stationary lower cup 21 of the juice extractor 13. The upper cup 19 then moves downwardly into interdigitation with the lower cup 21, thereby squeezing the orange F on all sides and pressing it against the annular knife blade 37 which cuts a circular plug P out of the orange peel. The pressure applied to the orange by the interdigitating cups 19 and 21 forces the plug P, and the juice, seeds and pulp of the orange down inside the straining tube 39, the lower end of which is blocked by the plunger 45 whose axial passage 49 is closed by the solid extraction residues R of previously processed oranges. As the orange juice, pulp and seeds are pressed into the tube 39 by the descent of the upper cup 19, the plunger 45 moves upwardly, thereby reducing the effective volume of the straining tube 39 and forcing the orange juice out through the perforations 40 into the chamber 31. As the upper cup 19 approaches its lowest position (not shown) and the plunger 45 approaches its highest position (also not shown), the seeds and the dry pulp from which all the juice has been extracted are forced into the axial passage 49 in the plunger 45 and the juice separating stage is completed. Subsequently, the upper cup 19 and the plunger 45 return to their highest and lowest positions, respectively, where they are ready to begin the extraction of juice from another orange.

As pointed out above, it has previously been the custom to make the pressure exerting member and the strainer of materials having like physical characteristics, since the conditions under which they operate are the same. For instance, where the separator must handle corrosive substances at high pressures, as in the present juice extracting apparatus, both the pressure exerting member and the strainer are usually made of stainless steel. However, as pointed out above, when these parts are made of materials having similar physical properties, and particularly when they are made from stainless steel, these parts tend to gall and seize very quickly. With the small clearance between the pressure exerting member and the strainer necessary to operate separators of the herein described type at their peak efficiency, even a slight amount of galling of either the pressure member or the strainer, or both, will cause the pressure member to stick in the strainer, resulting in damage to the strainer and the pressure member, the application of uneven loads on the operating mechanism, and ultimately, seizing of the pressure member in the strainer. Consequently, those in the art are faced with a problem, namely, either the clearance between the pressure member and the strainer must be made small and the pressure member and strainer frequently replaced, or the clearance between the pressure member and the strainer must be made large enough that it will take a larger time before the galling of the pressure member and the strainer is sufficient to require the replacement thereof, and even this extended time between replacements is not of any great length. Obviously, neither of these alternatives is desirable since the former increases the maintenance costs of the separator and the latter greatly reduces the efficiency of the separator by permitting excessive leakage of liquid between the pressure member and the strainer. This situation is presently met by making the clearance between the pressure member and the strainer somewhat more than the optimum and by replacing the pressure member and the strainer more frequently than is to be desired, thereby achieving at least a workable compromise.

In accordance with the present invention, the above mentioned disadvantages have been found to be eliminated by making the bearing surface on either the pressure exerting member or the strainer softer than the bearing surface of the other. Thus in the separator 17 the upper portion of the outer surface of the plunger 45 is provided with a shield 57 (Fig. 2) of a material, such as plastic, that is relatively soft when compared with the material from which the strainer is made. Of course when corrosive substances are being separated, such as citrus fruit juice and pulp, this shield material must also be corrosion resistant. This shield may be in the form of a relatively thick pre-formed sleeve 59 of an elastic, corrosion resistant plastic, such as polytetrafluorethylene resin sold under the trade mark "Teflon." The sleeve 59 is applied to the plunger 45 by expanding it over the upper end portion thereof, sliding it down into a position below the knife 55 and permitting it to contract tightly around the plunger 45. The sleeve 59 is prevented from moving axially on the plunger by annular flanges 61 and 63, which define an annular groove and are formed integral with the plunger and so spaced that they contact the upper and lower ends of the sleeve 59, respectively. The plunger 45 and the plastic sleeve 59 are so formed that the outer surface of the sleeve 59 lies very close to the inner surface of the straining tube 39. It has been found practical to make the clearance between the plastic sleeve 59 and the straining tube 39 one to two thousandths (.001 to .002) of an inch, whereas, it has previously been standard practice to make the clearance between unshielded stainless steel plungers and stainless steel straining tubes no smaller than five to six thousandths (.005 to .006) of an inch. Thus, an extremely close fit may be obtained between the shielded plunger and the straining tube, thereby greatly increasing the operating efficiency of the separating apparatus 17.

This extremely close fit is practicable because it has been found that with the bearing surface of the plunger made of a relatively soft material such as plastic, or the like, the tendency of the opposed bearing surfaces of the plunger and the strainer to gall is almost completely eliminated. Furthermore, the wear occasioned by the bearing loads on these opposed surfaces occurs almost entirely on the softer surface which, in the case of the plastic sleeve 59 can be easily and inexpensively replaced. Such replacement, however, is found to be necessary much less frequently than was previously required by the seizure of the unshielded plungers and the strainer under practical operating conditions.

While I have described a preferred embodiment of the present invention, it will be understood that various changes and modifications may be made in the details thereof without departing from the spirit and scope of the appended claims.

Having thus described the invention, what I claim as new and desire to protect by Letters Patent is:

1. In an apparatus for separating liquid and solid material having a perforated straining tube adapted to receive a liquid and solid mass and a rigid tubular plunger movable within the straining tube for exerting pressure on the liquid and solid mass to force the liquid portion thereof out of the tube through its perforations and the solid portion thereof through said tubular plunger, an arrangement for preventing sticking of the plunger in the straining tube comprising an expandable knife supported on one end of the tubular plunger projecting axially outwardly therefrom and adapted to bear against the inner surface of the straining tube to remove accumulations of solid material therefrom upon pressure exerting movement of said plunger, said expandable knife defining an opening for receiving and compressing solids, said opening being arranged to communicate with the bore of said tubular plunger for discharging the solid portion of the mass therethrough, and an open ended tubular sleeve of material that is relatively soft compared with the material of the inner surface of the straining tube tightly covering substantially the entire outer wear surface of the plunger to prevent galling of said tube and said plunger.

2. An apparatus for separating corrosive liquid and solid material comprising a perforated straining tube adapted to receive a mass of corrosive liquid and solid matter, a rigid tubular plunger concentric with the tube and reciprocable therein, an expandable annular knife secured on and projecting axially outward from one end of said tubular plunger and defining a solid receiving opening therein which communicates with the bore of said tubular plunger for discharging the solid matter through said opening and through said bore after the solid matter has been compressed, said plunger having axially spaced radial shoulders formed on its outer surface defining a groove therebetween which covers a major portion of said rigid plunger, and an elongated one-piece tubular sleeve of non-corrodible elastic plastic received in said groove and held against axial displacement between said spaced shoulders, whereupon reciprocal movement of said tubular plunger in said housing compresses the solid and liquid mass within the cavity in said knife to expand said knife and cause the liquid portion of the mass to be forced out of the tube through its perforations and the solid portion of the mass to be extruded through the cavity in said knife and through said tubular plunger.

References Cited in the file of this patent

UNITED STATES PATENTS

| | | |
|---|---|---|
| 626,727 | Shepherd | June 13, 1899 |
| 1,320,210 | Eckelbarger | Oct. 28, 1919 |
| 1,453,448 | Day | May 1, 1923 |
| 1,523,986 | Schmidt | Jan. 20, 1925 |
| 1,584,520 | Duncan | May 11, 1926 |
| 1,756,205 | Merrick | Apr. 29, 1930 |
| 1,856,272 | Summers | May 3, 1932 |
| 1,911,687 | Hafley | May 30, 1933 |
| 2,510,764 | Stadler | June 6, 1950 |
| 2,649,730 | Hait | Aug. 25, 1953 |
| 2,705,177 | Waring | Mar. 29, 1955 |
| 2,705,916 | Millgard | Apr. 12, 1955 |
| 2,735,735 | Abel | Feb. 21, 1956 |